United States Patent
Hino et al.

(10) Patent No.: US 8,779,646 B2
(45) Date of Patent: Jul. 15, 2014

(54) ACTUATOR

(75) Inventors: Tetsuo Hino, Yamato (JP); Sotomitsu Ikeda, Yokohama (JP); Amita Goyal, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 13/634,797

(22) PCT Filed: Apr. 19, 2011

(86) PCT No.: PCT/JP2011/060005
§ 371 (c)(1),
(2), (4) Date: Sep. 13, 2012

(87) PCT Pub. No.: WO2011/136154
PCT Pub. Date: Nov. 3, 2011

(65) Prior Publication Data
US 2012/0326557 A1    Dec. 27, 2012

(30) Foreign Application Priority Data
Apr. 27, 2010  (JP) ................................. 2010-102520

(51) Int. Cl.
*H02N 1/00* (2006.01)
*H02N 2/00* (2006.01)
*H01L 41/00* (2013.01)

(52) U.S. Cl.
USPC ............ 310/308; 310/330; 310/331; 310/365

(58) Field of Classification Search
CPC ... H01L 41/047; H01L 41/0926; H01L 41/39; H01L 41/083; H01L 57/00
USPC .................. 310/308, 330, 331, 332, 363, 365
See application file for complete search history.

(56) References Cited

U.S. PATENT DOCUMENTS

| | | | |
|---|---|---|---|
| 8,543,201 B2 * | 9/2013 | O'Phelan et al. ................. 607/5 |
| 2010/0227521 A1 * | 9/2010 | Whinnery ...................... 442/189 |
| 2012/0032553 A1 * | 2/2012 | Goyal et al. ................... 310/300 |
| 2012/0235545 A1 * | 9/2012 | Hino et al. ..................... 310/365 |
| 2013/0119821 A1 * | 5/2013 | Hino et al. ..................... 310/300 |
| 2013/0181572 A1 * | 7/2013 | Hino et al. ..................... 310/311 |

FOREIGN PATENT DOCUMENTS

| | | |
|---|---|---|
| JP | 10-144974 A | 5/1998 |
| JP | 2005-176428 A | 6/2005 |
| JP | 2006-166694 A | 6/2006 |
| JP | 2009-59856 A | 3/2009 |

* cited by examiner

*Primary Examiner* — Terrance Kenerly
(74) *Attorney, Agent, or Firm* — Canon U.S.A., Inc., IP Division

(57) ABSTRACT

The present invention relates to an actuator including a supporting portion including a first electrode, a second electrode disposed opposite the first electrode, and a part of a planar electrolyte member disposed therebetween, and having terminals configured to apply a voltage between the first and second electrodes; a displacement portion; and an intermediate portion disposed between the supporting portion and the displacement portion and including a third electrode on the electrolyte member and a conductive connecting member. The third electrode includes linear members and a conductive material. The linear members have major axes thereof extending in a direction crossing a direction from the supporting portion toward the displacement portion. The third electrode has conduction paths through which a current flows in the crossing direction. The conductive connecting member is electrically connected to one of the first and second electrodes and electrically connects the conduction paths together.

5 Claims, 4 Drawing Sheets

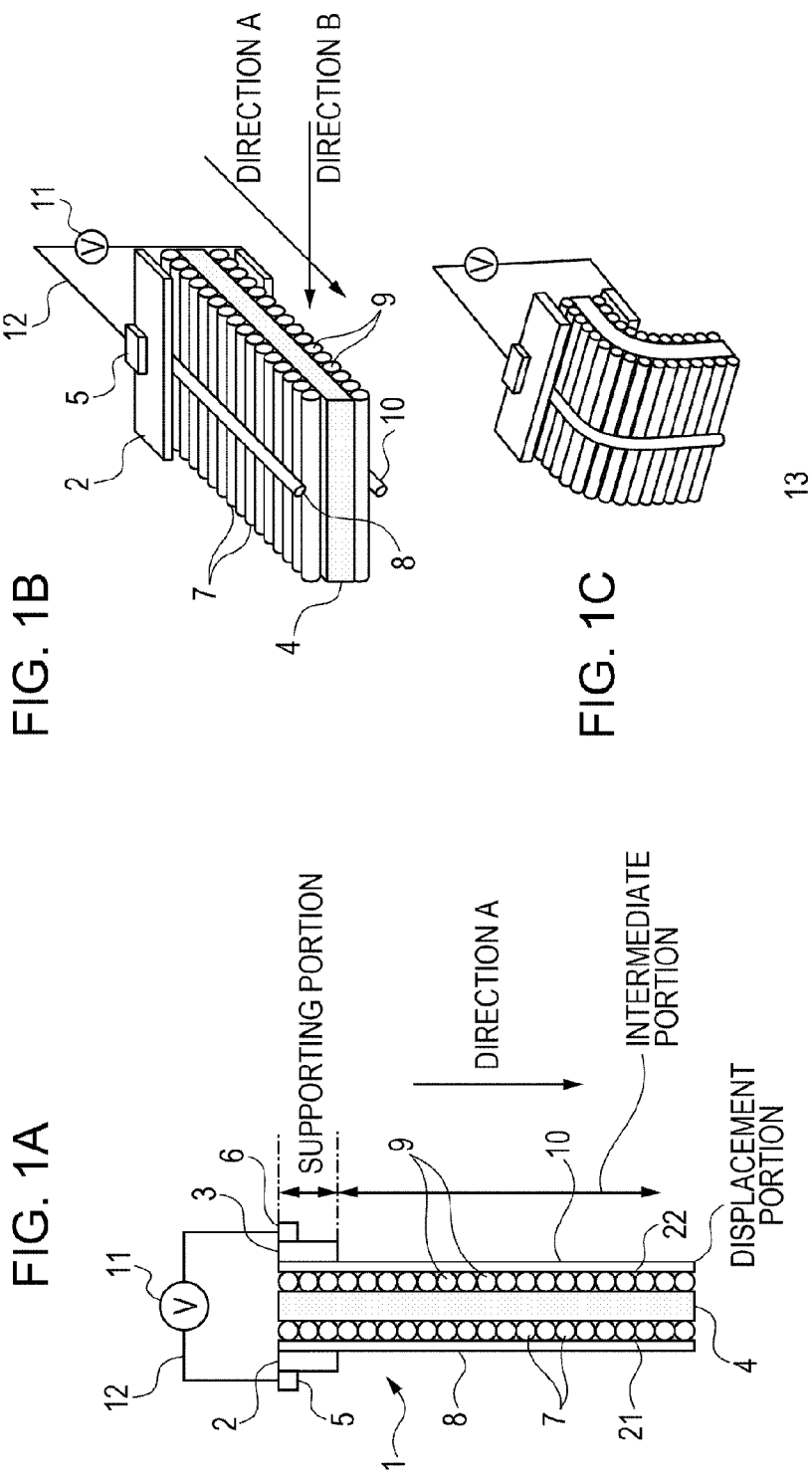

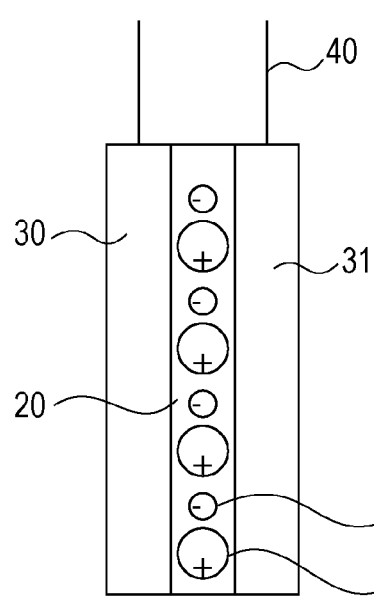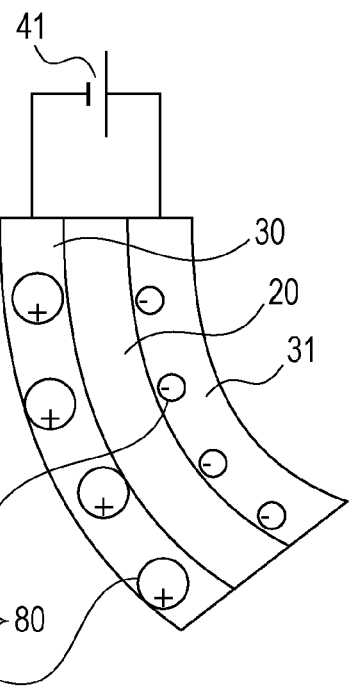

ACTUATOR

TECHNICAL FIELD

The present invention relates to actuators.

BACKGROUND ART

Recently, actuators using organic polymers have been developed.

PTL 1 discloses an elongated actuator, as shown in FIGS. 2A and 2B, having a pair of electrodes formed of cast films (single-films) of a conductive material (carbon nanotubes (CNTs)), an ionic liquid, and an organic polymer. An electrolyte layer formed of an ionic liquid and an organic polymer is disposed between the pair of electrodes. This actuator bends when a voltage is applied between terminals between which an end of the actuator in the longitudinal direction is held. The applied voltage causes electrons or holes to move into the electrodes to induce a potential difference between the electrodes so that ions migrate from the electrolyte layer into the electrodes. This changes the volume of the electrodes, thus bending the actuator.

CITATION LIST

Patent Literature

PTL 1 Japanese Patent Laid-Open No. 2005-176428

SUMMARY OF INVENTION

Technical Problem

An actuator having an electrolyte layer held between electrodes formed of single-films, such as cast films, has a problem in that the actuator does not bend easily because of its high flexural rigidity.

Accordingly, the present invention provides an actuator that can bend easily to produce a large amount of displacement.

Solution to Problem

An actuator according to an aspect of the present invention includes a supporting portion including a first electrode, a second electrode disposed opposite the first electrode, and a part of a planar electrolyte member disposed therebetween, and having terminals configured to apply a voltage between the first and second electrodes; a displacement portion configured to be displaced as a voltage applied between the first and second electrodes causes ions in the electrolyte member to migrate; and an intermediate portion disposed between the supporting portion and the displacement portion and including a third electrode on the electrolyte member and a conductive connecting member configured to supply a current to the third electrode. The third electrode includes a plurality of linear members and a conductive material. The linear members have major axes thereof extending in a direction crossing a direction from the supporting portion toward the displacement portion. The third electrode has a plurality of conduction paths through which a current flows in the crossing direction. The conductive connecting member is electrically connected to one of the first and second electrodes. The conductive connecting member electrically connects the conduction paths together.

Advantageous Effects of Invention

According to the above aspect of the present invention, an actuator that can deform largely can be provided.

BRIEF DESCRIPTION OF DRAWINGS

FIG. 1A is a sectional view of an actuator according to an embodiment of the present invention.

FIG. 1B is a schematic perspective view of the actuator according to the embodiment of the present invention.

FIG. 1C is a schematic perspective view of the actuator being bent.

FIG. 1D is a schematic diagram of a linear electrode.

FIG. 2A is a schematic diagram showing ions that are to migrate before application of a voltage to the actuator.

FIG. 2B is a schematic diagram showing ions that have migrated after application of a voltage to the actuator.

DESCRIPTION OF EMBODIMENTS

Figure 3:
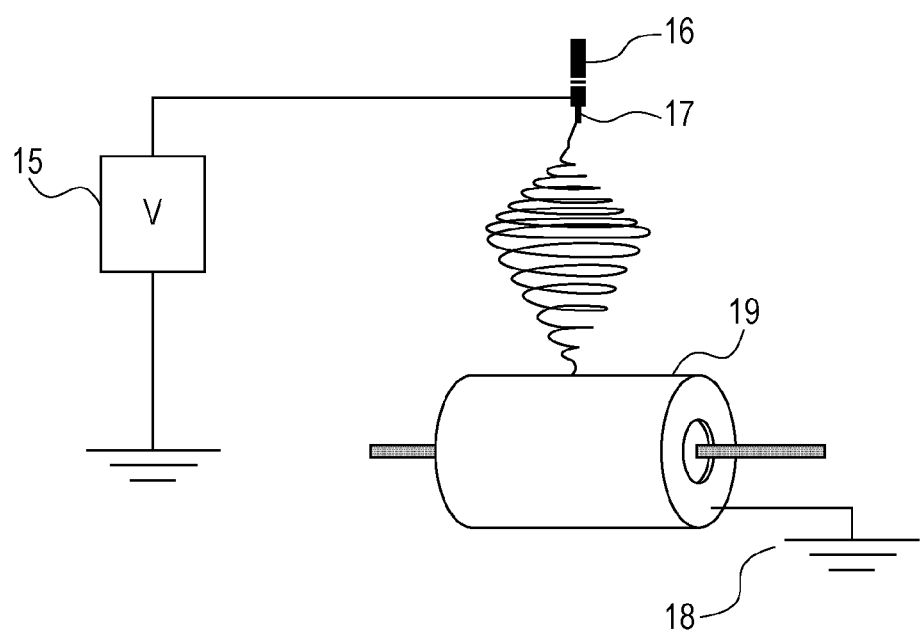
FIG. 3 is a schematic diagram of an apparatus for producing linear electrodes.

An embodiment of the present invention will now be described. FIG. 1B is a schematic perspective view of an actuator according to an embodiment of the present invention. FIG. 1A is a sectional view, including conductive connecting members 8 and 10, taken along direction A of FIG. 1B as viewed in direction B. Referring to FIG. 1A, an actuator 1 according to this embodiment includes a supporting portion, an intermediate portion, and a displacement portion.

The supporting portion includes a first electrode 2, a second electrode 3 disposed opposite the first electrode 2, and a part of a planar electrolyte member 4 disposed between the first electrode 2 and the second electrode 3. In addition, the supporting portion has terminals 5 and 6 configured to apply a voltage between the first electrode 2 and the second electrode 3.

The intermediate portion is disposed between the supporting portion and the displacement portion and includes a third electrode on the electrolyte member 4 and a conductive connecting member 8 configured to supply a current to the third electrode. The third electrode includes a plurality of linear members 7 and a flexible conductive member 21 filling the gaps between the linear members 7. The linear members 7 have the major axes thereof extending in a direction crossing the direction from the supporting portion toward the displacement portion. That is, the third electrode includes a conductive material.

The linear members 7 have the major axes thereof extending in the direction (direction B in FIG. 1B) crossing the direction (direction A in FIG. 1B) from the supporting portion toward the displacement portion. In addition, the third electrode has a plurality of conduction paths through which a current flows in crossing direction B. The conduction paths may be formed by linear electrodes serving as the linear members 7 or by a flexible conductive member filling the gaps between the linear members 7.

The conductive connecting member 8 is electrically connected to one of the first electrode 2 and the second electrode 3 (to the first electrode 2 in FIGS. 1A and 1B).

In addition, the conductive connecting member 8 electrically connects the conduction paths together.

With this structure, the displacement portion is displaced as a voltage applied between the first electrode 2 and the second electrode 3 causes ions in the electrolyte member 4 to migrate.

Figure 4:
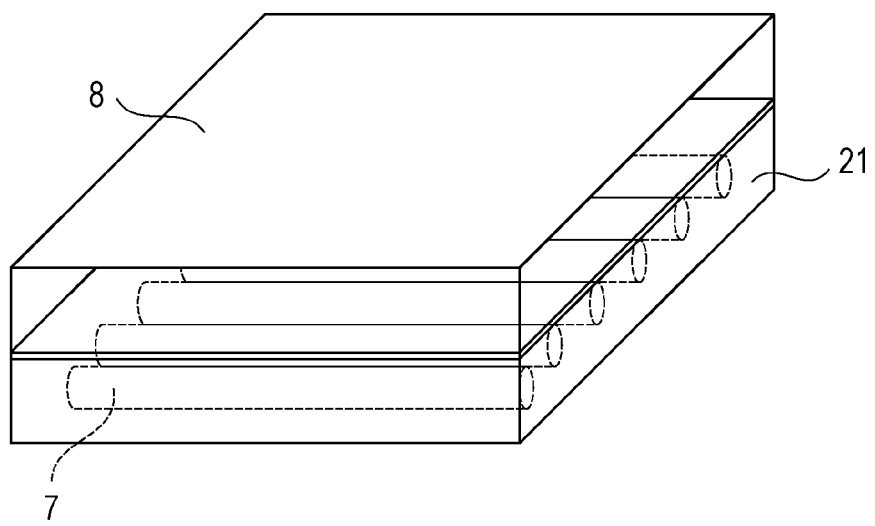
FIG. 4 is a schematic diagram showing linear members and a flexible conductive member filling gaps therebetween.

In FIG. 1, the linear members 7 of the third electrode are formed of linear electrodes containing a conductive material; as shown in FIG. 4, as described later, the third electrode may include a flexible conductive member filling the gaps between the linear members 7. In either case, a plurality of conduction paths through which a current flows in crossing direction B are formed such that a current flows to both ends in direction B, thus allowing ions to migrate over a larger area when a voltage is applied.

If the linear members 7 are formed of linear electrodes containing a conductive material, the electrolyte member 4 can have, on one surface thereof, a plurality of first linear electrodes 7 serving as a third electrode and a first conductive connecting member 8 configured to supply a current to the first linear electrodes 7 such that the first conductive connecting member 8 electrically connects the first linear electrodes 7 together, and can also have, on the other surface thereof, a plurality of second linear electrodes 9 serving as another third electrode and a second conductive connecting member 10 configured to supply a current to the second linear electrodes 9 such that the second conductive connecting member 10 electrically connects the second linear electrodes 9 together.

This structure allows the planar electrolyte member 4 to be easily bent on both surfaces thereof and a voltage to be widely applied to the electrolyte member 4 so that the actuator 1 can bend more easily than known actuators.

The terminals 5 and 6 are connected to a drive power supply 11 via leads 12.

One end (supporting end) of the actuator 1 is the supporting portion, and the two opposing electrodes 2 and 3 in the supporting portion are connected to the terminals 5 and 6, respectively.

When the drive power supply 11 applies a voltage between the terminals 5 and 6, the voltage is applied between the electrodes 2 and 3 and is also maintained in the displacement portion of the actuator 1 via the conductive connecting members 8 and 10.

That is, when a voltage is applied between the first electrode 2 and the second electrode 3, which are disposed opposite each other with the electrolyte member 4 therebetween, as shown in FIG. 1C, the voltage is also applied to the intermediate portion including the linear members 7 and 9, thus bending the displacement portion (displacement end) remote from the supporting portion.

The actuator 1 bends as ions present in the electrolyte member 4 before the voltage application migrate to at least one of the electrodes 2 and 3. As a result of bending, one end (displacement portion) of the actuator 1 in the longitudinal direction moves in the same direction as the stacking direction.

The linear members 7 (and 9) are arranged in large numbers so as to be oriented and cover the surfaces of the planar electrolyte member 4. Each linear member can be formed of any material that does not obstruct the operation of the actuator 1. In view of flexibility, each linear member can be formed of a polymer fiber containing at least a polymer material. In addition, in view of conductivity, as shown in FIG. 1D, each linear electrode can be formed of a fibrous polymer material 14 containing a conductive material 13 such as a nanocarbon material.

The flexible conductive member 21 filling the gaps between the linear members 7 can be formed of any material that is flexible and conductive sufficient not to impair the operation of the actuator 1. In view of flexibility, the flexible conductive member 21 can contain at least a gel material or a polymer material. In addition, in view of conductivity, the flexible conductive member 21 can be formed of a polymer material containing a conductive material such as a nanocarbon material.

Because the actuator 1 according to this embodiment includes the conductive connecting members 8 and 10 electrically connecting together the conduction paths, a voltage can be efficiently applied to the entire region of the electrolyte member 4 covered by the third electrodes.

That is, the terminal 5, the first electrode 2, the conductive connecting member 8, and the third electrode including the linear members 7 can be considered a single electrode layer in which they are electrically connected together, whereas the terminal 6, the second electrode 3, the conductive connecting member 10, and the third electrode including the linear members 9 can be considered another single electrode layer in which they are electrically connected together. With the structure according to this embodiment, when the drive power supply 11 applies a voltage between the terminals 5 and 6, electrons (or holes) can move) easily to the ends of the actuator 1 in the lateral direction and to the ends of the actuator 1 in the longitudinal direction, thus reducing a potential difference in each electrode layer.

If the linear members 7 and 9 are linear electrodes containing a conductive material and flexible conductive members filling the gaps between the linear members 7 and 9 are disposed, the conduction tends to be better. In addition, if linear electrodes are used as the linear members 7 and 9, a voltage can be efficiently applied to the entire electrolyte member 4 even if the flexible conductive members, which are formed so as to extend from the supporting portion to the displacement portion, are not present over the entire surfaces of the electrolyte member 4 covered with the linear members 7 and 9 (linear electrodes).

In addition, at least one of the electrode layers can include a plurality of linear members such that the longitudinal directions of the linear members are aligned in a direction crossing the direction from the supporting portion toward the displacement portion.

Because the linear members 7 (and 9) are disposed so as to cross the bending direction, the actuator 1 has low resistance to bending due to the flexural rigidity thereof. As a result, the actuator 1 can bend smoothly, thus producing a large amount of displacement in bending.

If a third electrode, as shown in FIG. 1B, is disposed on one of the two opposing surfaces of the planar electrolyte member 4 and a single-film electrode is disposed on the other surface instead of a third electrode, the actuator 1 is more responsive in one direction (that is, bends anisotropically).

For example, for an actuator having a three-layer structure including an electrode layer A including linear electrodes, a planar electrolyte member, and a single-film electrode B, the electrode layer A has a lower flexural rigidity than the single-film electrode B in the bending of the displacement portion remote from the supporting portion. Accordingly, with the same potential difference, the displacement of the actuator to the electrode layer B side is larger than that to the electrode layer A side. It should be noted, however, that if the linear electrodes according to this embodiment are used on both surfaces of the electrolyte member, they reduce the resistance to bending due to flexural rigidity in either bending direction, thus producing a larger amount of displacement in either bending direction than a single-film.

That is, as shown in FIG. 1A, if the first electrode 2 and the second electrode 3 have the linear members 7 and 9, respectively, the flexural rigidity in bending can be further reduced.

In particular, if the longitudinal directions of the linear members 7 and 9 are both aligned in a direction crossing the direction from the supporting portion toward the displacement portion, the flexural rigidity in bending can be significantly reduced on both surfaces of the electrolyte member 4, and consequently the actuator 1 can produce a larger displacement as a whole. Nevertheless, the directions of the linear members 7 and 9 on both surfaces may differ.

In addition, the flexible conductive member 21 is disposed so as to fill the gaps between the linear members 7. In the schematic diagram shown in FIG. 4, the flexible conductive member 21 fills the gaps between the linear members 7 in FIG. 1 and is in contact with the conductive connecting member 8. Similarly, as shown in FIG. 1, a flexible conductive member 22 is disposed between the linear members 9. Some of the gaps may be left empty as long as they do not greatly affect the operation of the actuator 1. In addition, spaces such as slits may be provided between the linear members 7 and 9 as long as they do not impair conduction from the first and second electrodes. As shown in FIG. 4, if the linear members 7 and 9 are regularly arranged on the two opposing surfaces of the electrolyte member 4 at equal intervals, the two surfaces can be easily maintained at the same potential. This allows the actuator 1 to bend more smoothly because it bends along the spaces.

As shown in FIG. 1C, even if the actuator 1 is largely displaced to widen the spaces between the linear electrodes 7 and 9, the conductive connecting members 8 and 10 maintain conduction from the terminals 5 and 6 to the displacement portion. This allows induction of a large displacement of the actuator 1.

The conductive connecting members 8 and 10 connecting together the conduction paths can be any members that can connect the conduction paths together to maintain conduction from the electrodes 2 and 3.

For example, the conductive connecting members 8 and 10 may be flexible conductive films stacked on the third electrodes (hereinafter referred to as "conductive layers") and having the same area as the conductive layers, or may be elongated planar or linear conductors having a smaller area than the conductive layers.

In addition, the conductive connecting members 8 and 10 connecting the electrodes 2 and 3 to the conduction paths of the third electrodes may be composed of a plurality of independent conductive connecting wires. In this case, any number of wires may be disposed at any positions.

In addition, although the conductive connecting members 8 and 10 can be provided in any size, the actuator 1 can bend more easily if the conductive connecting members 8 and 10 are composed of members having a smaller area than the conductive layers. In particular, the conductive connecting members 8 and 10 can be composed of fewer elongated planar or linear members, more particularly, a single member. In the case of a single member, the potential difference between both sides (sides in direction B) is smaller if the member is disposed in the center of the conductive layer, as shown in FIG. 1B, than at either side. This allows both sides to be easily bent symmetrically so that the displacement portion at the end can be bent symmetrically. In particular, as shown in FIG. 1B, the conductive connecting members 8 and 10 can be disposed so as to extend from the centers of the electrodes 2 and 3 to the center of the displacement portion.

In addition, the conductive connecting members 8 and 10 may be disposed in direct contact with the conductive layers composed of the third electrodes, as shown in FIG. 1B, or may be disposed so as to pass through the conductive layers or be disposed between the planar electrolyte member 4 and the conductive layers.

In particular, for an efficient manufacturing process, the conductive connecting members 8 and 10 can be disposed on the surfaces of the conductive layers not in contact with the planar electrolyte member 4, that is, the surfaces of the conductive layers in contact with the electrodes 2 and 3.

Whereas an actuator of elongated rectangular sheet shape, that is, of strip shape, has been described, it may have any overall shape. For example, a shape such as a circular, triangular, oval, or elongated sheet, film, cylinder, spiral, or coil can be selected.

In addition, whereas the strip-shaped actuator illustrated in this embodiment has the supporting portion (supporting end) and the displacement portion (displacement end) at either end, it is possible to dispose the supporting portion in the center and the displacement portion at each end.

In addition, the first electrode 2 and the second electrode 3 may have the same shape or different shapes.

In addition, the actuator 1 may be configured either as a single actuator or as a composite of actuator structures.

Drive Mechanism of Actuator

An ion migration actuator, as illustrated in this embodiment, bends as a voltage applied between a pair of electrodes causes ions in an electrolyte to migrate.

The drive mechanism of the actuator according to this embodiment is presumably similar to that of a known multilayer actuator including two single-film electrodes and a planar electrolyte member therebetween.

The drive mechanism of the actuator will now be described with reference to FIGS. 2A and 2B.

As shown in FIG. 2A, two electrodes 30 and 31 are formed on either surface of a planar electrolyte member 20 so as to be insulated from each other.

When a voltage is applied between the two electrodes 30 and 31 such that the electrode 30 serves as the cathode and the electrode 31 serves as the anode, as shown in FIG. 2B, cations 70 migrate from an electrolyte 80 into the electrode 31, serving as the cathode, and anions 60 migrate from the electrolyte 80 into the electrode 30, serving as the anode. As a result, electric double layers are formed at the interfaces between the conductive materials in the electrodes 30 and 31 and the ionic material phase.

To configure an actuator operable in air, an ionic liquid, which has negligible vapor pressure, can be used as the electrolyte 80. In the ionic liquid, the cations 70 have a larger ionic radius than the anions 60.

The electrode 31 expands more than does the electrode 30 because of the steric effect of the ions present in the electrodes 30 and 31 in synergy with, for example, electrostatic repulsion due to the electric double layers. That is, deformation occurs in a direction in which the cathode extends more than does the anode, thus bending the actuator. In general, the film bends in the opposite direction if the polarity of the potential is reversed.

In addition, the displacement direction varies depending on the arrangement of the electrodes and the structure of the planar electrolyte member. Instead of bending, an action such as extension or twisting can be implemented by modifying the arrangement of the electrodes and the structure of the planar electrolyte member.

The voltage applied to the actuator can be set so as not to exceed the withstand voltage of the electrolyte. For example, the actuator can be driven at 4 V or less if an ionic liquid is used as the electrolyte.

Structure of Electrodes for Applying Voltage to Electrolyte Member

Whereas the actuator according to this embodiment includes at least the third electrodes including the linear members and the flexible conductive members as the electrodes for applying a voltage to the planar electrolyte member, other electrode materials can also be used, including known electrode materials used for electrodes of soft actuators. Examples of such electrode materials include conductive polymers; conductive materials, such as CNTs, packed in flexible polymer materials; and single flexible gel films containing at least a conductive material such as CNTs and an organic polymer. In this case, the cross-sectional shape of the electrodes can be an angular shape such as a square, rectangle, or rhombus or a round shape such as a circle or oval.

The thickness of the electrodes can be set so as not to obstruct deformation of the actuator. Specifically, the electrodes preferably have a thickness of 1 µm to 5 mm, more preferably 5 µm to 2 mm, and still more preferably 10 µm to 500 µm.

If the thickness of the electrodes is 1 µm or more, they are sufficiently conductive as the electrodes of the actuator. If the thickness is 5 mm or less, flexible electrodes can be formed while inhibiting the influence of the increased rigidity or plasticity due to the conductive material.

The thicknesses and materials of the anode and the cathode do not have to be the same and may be appropriately selected depending on the desired actuator characteristics.

In addition, the electrodes preferably have a resistivity of 1,000Ω·cm or less, more preferably 100Ω·cm or less. In addition, the electrodes can have a Young's modulus of 0.1 to 600 MPa. If the Young's modulus falls within this range, the actuator has flexibility and extendability appropriate for actuator operation and is also resistant to plastic deformation. Thus, an ion conduction actuator with higher durability for repeated use can be fabricated.

Structure of Linear Members

The linear members according to this embodiment are flexible linear members whose length is larger than the thickness thereof. The thickness of the linear electrodes can be 0.05 to 50 µm, and the length thereof can be ten times or more the thickness. In particular, organic polymer fibers produced by the method described later can be used. For linear members containing a conductive material, that is, linear electrodes, a material having both flexibility and conductivity can be used. An example of such a material is a composite of a carbonaceous conductive material and an organic polymer. In particular, organic polymer fibers, containing a carbonaceous conductive material, produced by the method described later can be used. The present inventors have demonstrated that fibers having a smaller thickness (diameter) allow the conductive material to be extended farther in the fibers in the longitudinal direction to inhibit aggregation and entanglement so that the conductive material is more regularly arranged in the longitudinal direction. The inventors have also demonstrated that the conductive material is highly uniformly dispersed in the fibers.

The thickness of the linear members can be 0.05 to 10 µm. In particular, the use of polymer fibers having a thickness of 0.05 to less than 1 µm, namely, nanofibers, tends to induce a significant supramolecular array effect to provide higher fiber rigidity. In addition, for linear members containing a conductive material, that is, linear electrodes, the conductive material can be more uniformly dispersed in the linear electrodes, thus further improving the conductivity of the resultant linear electrodes containing the conductive material.

That is, if the polymer fibers are thin, the molecular chains of the conductive material are regularly arranged such that they are extremely stretched inside. This significantly inhibits aggregation and entanglement, thus allowing fabrication of a soft actuator having superior characteristics such as very fast deformation response.

The cross-sectional shape of the linear electrodes can be a circle, oval, square, polygon, or semicircle, and can be different in any cross section.

In addition, a conductive material such as a metal or carbon may be applied to the surfaces of the linear members, the flexible conductive members, and the conductive connecting members for increased surface conductivity. The thickness of the linear members refers to the diameter of the cross-section of the linear members in the case where they have a circular cross section, that is, the length of the longest straight line passing through the center of gravity in the cross section of the fibers. In addition, the linear members may be disposed in a single layer, as shown in FIG. 1B, or may be disposed in multiple layers.

Method for Producing Linear Members

Examples of methods for producing linear members include electrospinning, multicomponent fiber spinning, polymer blend spinning, melt-blown spinning, and flash spinning.

Among others, electrospinning allows spinning of various polymers into fibers and easy shape control. In addition, nano-sized fibers can be formed, and they can be easily bundled into a meter-sized large electrode. Thus, electrospinning is suitable as the method for producing the linear electrodes according to this embodiment.

Referring to FIG. 3, electrospinning is performed using a voltage source 15, a storage tank 16 for storing a polymer solution, a spinneret 17, and a rotary drum collector 19 connected to a ground 18.

The polymer solution is pumped from the storage tank 16 to the spinneret 17 at a predetermined speed. The pumping can be implemented by configuring the tank 16 as, for example, a syringe. When a voltage of 1 to 50 kV is applied to the spinneret 17, and the electrostatic attraction overcomes the surface tension of the polymer solution, a jet of the polymer solution is ejected toward the rotary drum collector 19.

During this process, the solvent in the jet is gradually volatilized, and accordingly the size of the jet is decreased to a nano level before it reaches the collector 19. The jet reaching the rotary drum collector 19 is continuously wound therearound to form a bundle of linear electrodes aligned uniaxially in a plane.

In addition, the winding speed of the rotary drum collector 19 can be controlled to control how the linear electrodes are uniaxially oriented and the thickness of the fibers. The higher the winding speed, the more uniaxially aligned (more oriented) the linear electrodes are, and the thinner the fibers are.

The polymer solution may be replaced with a molten polymer heated to the melting point or higher.

With the above method, polymer fibers containing a conductive material can be easily produced.

In particular, the raw material, namely, a conductive material dispersion, can be prepared in a good condition if the conductive material is fragmented by applying shear in an ionic liquid and optionally a polymer. This fragmentation is performed by applying shear force to the conductive material.

The shear force can be applied using a manual or automatic mortar; a wet mill capable of applying high shear force, such as a ball mill, roll mill, or vibrating mill; or a kneader. In addition, the shear force can be applied after adding a solvent to adjust the viscosity.

Whereas the degree of fragmentation can be appropriately changed, the shear force may be applied for about five minutes to one hour.

The use of a dispersion having a conductive material well dispersed therein as the raw material for electrospinning allows formation of linear electrodes having the conductive material well dispersed therein.

In particular, a combination of CNTs and an ionic liquid can be used in this embodiment to form a gel composition having CNTs well dispersed therein.

Although the generation mechanism and structure of the gel composition remains partially unclear, the results of various analyses suggest that they are roughly understood as follows:

(1) The fragmentation treatment under shear force does not chemically degrade the CNTs, but physically changes the shape thereof by reducing entanglement of the CNTs with each other to make the bundles thereof thinner; and (2) The formation of a gel presumably results not from the entanglement of the CNTs, but from a crosslinked structure (three-dimensional network structure) formed as the molecules of the ionic liquid bound to the surfaces of the CNTs with reduced entanglement by the cation-$\pi$ interaction link the bundles of the CNTs together through ionic bonds.

In addition, the actuator according to this embodiment can include third electrodes containing an electrolyte. The electrolyte may be contained by any method, for example, by forming the linear members and the flexible conductive members filling the gaps between the linear members and then dipping them in an electrolytic solution.

Orientation of Linear Members

The longitudinal directions of the linear members are uniaxially aligned in the planes of the conductive layers. The linear members can be oriented by a known technique. With electrospinning, described above, the linear members can easily be uniaxially aligned.

The polymer orientation can be evaluated as the degree of polymer orientation (%), which can be defined as the proportion of linear members uniaxially aligned in the planes of the third electrodes. The higher the value is, the more oriented the polymer is. The proportion of linear members uniaxially aligned in the plane of a conductive layer can be measured by the following method.

The degree of polymer orientation (%) can be easily calculated by analyzing an image of a conductive layer observed by scanning electron microscopy (SEM) using the analysis command "orientation distribution measurement" of image processing software available from Asahi Kasei Engineering Corporation under the trade name "A-Zo Kun."

Specifically, the inclinations of the fibers are divided into 18 grades in increments of 10° from 0° to 180°, a histogram showing the number (frequency) of fibers in each grade is drawn, and the degree of polymer orientation (%) is calculated by the following formula:

Degree of orientation (%)=(number of intervals with frequencies less than or equal to half maximum frequency/total number of intervals)×100

A higher degree of orientation indicates that the proportion of linear members uniaxially aligned in the planes of the third electrodes is higher. As used herein, the phrase "the linear members are uniaxially aligned in the planes of the conductive layers" means that the degree of orientation of the linear members is 30% or more.

Orientation of Conductive Material

If the conductive material present in the conduction paths, that is, the linear electrodes or the flexible conductive members filling the gaps between the linear members, is of anisotropic shape, it can be uniaxially aligned.

This improves not only the conductivity in the orientation direction, but also the mechanical strength.

The orientation of the conductive material can be evaluated by etching the surface of a linear electrode, directly imaging the conductive material inside the linear electrode by electron microscopy, and calculating the degree of orientation by the above formula using the above image processing software. In this case, the degree of orientation of the conductive material dispersed in the linear electrodes can be 80% or more with respect to the longitudinal directions of the linear electrodes. This allows production of an actuator having high mechanical strength and very fast deformation response.

The orientation of the conductive material can also be evaluated by X-ray scattering spectroscopy or polarization spectroscopy on the conductive layers.

The orientation evaluation by X-ray scattering spectroscopy is based on the anisotropy of a scattering azimuth distribution of scattered X-rays derived from the conductive material. If the conductive material is oriented in the direction along the major axis (hereinafter referred to as "fiber axis") of the linear electrodes, the scattering pattern of scattered X-rays has streaks concentrated in the fiber equator direction with respect to the fiber axis. On the other hand, if the conductive material is less oriented, the scattering pattern has fewer streaks concentrated in the fiber equator direction. If the conductive material is unoriented, the scattering pattern is completely isotropic. Thus, the orientation of the conductive material can be evaluated from the azimuthal anisotropy of the X-ray scattering pattern.

The orientation evaluation by polarization spectroscopy, on the other hand, is performed by measuring a polarized spectrum such as a polarized absorption spectrum or polarized Raman spectrum and evaluating the orientation from the measurement results. For example, polarized Raman spectroscopy, as described below, allows easy evaluation of p-value, which indicates the orientation ratio (how oriented) of CNTs. In polarized Raman spectroscopy, the p-value is measured as follows.

First, the G-band intensity (X) of a Raman spectrum (for example, C=C band) of polarized laser light incident on a conductive layer in oscillating direction A (plane of polarization) is measured. Next, the G-band intensity (Y) of a Raman spectrum of light oscillating in direction B perpendicular to direction A is similarly measured by rotating only the plane of polarization through 90° while maintaining the optical system. From the above measurements, the p-value is calculated by the following formula:

$$p=Y/X$$

The intensity of a Raman spectrum in each oscillating direction indicates the abundance of molecules Raman-active in the oscillating direction. Hence, the direction having the largest difference (the lowest p-value with direction A being the orientation direction) is the orientation direction, and the p-value thus calculated serves as a measure for evaluating the orientation. The p-value indicates the proportion of the conductive material uniaxially aligned in a plane in the linear electrodes, and unlike the degree of orientation described above, a lower p-value indicates a higher orientation. Although in this case the orientation of CNTs is evaluated on the basis of the G-band intensity of the C=C band, the target band can be appropriately selected depending on the conductive material used.

A similar measurement can be performed with an absorption spectrum. In particular, an absorption spectrum can be employed for measurement on conductive polymers. The p-value approaches 0 if all CNTs are oriented in direction A and is 1 for random orientation. The p-value of the actuator according to this embodiment is preferably 0 to 0.6, and the upper limit of the p-value is more preferably 0.2, still more preferably 0.1.

Constituent Materials
Examples of Constituent Materials for Linear Members

The linear members can be formed of any material and can be either insulating members or conductive members. For example, polymer materials, which are highly flexible, can be used. For insulating linear members, various insulating materials can be used, including fluoropolymers such as polytetrafluoroethylene and polyvinylidene fluoride; polyolefins such as polyethylene and polypropylene; polybutadienes; polyurethanes such as elastomers and gels; silicones; polystyrene; polyvinyl chloride; and engineering plastics such as polyethylene terephthalate, polyimide, and polyamide. These polymers can be used alone or in combination, can be functionalized, and can be copolymerized with another polymer.

For conductive linear members (linear electrodes), metal wires can be used. In view of flexibility, on the other hand, conductive polymers and polymer materials containing a conductive material can be used.

The conductive material dispersed in the linear electrodes can be a single carbonaceous conductive material or a mixture of carbonaceous conductive materials. Examples of carbonaceous conductive materials include graphite, carbon black, acetylene black, Ketjen black, active carbon fiber, and nanocarbon materials such as carbon whiskers (vapor-grown carbon), carbon (nano)filaments, carbon nanoparticles, and CNTs. Conductive polymers can also be used. Of these, nanocarbon materials, particularly CNTs, can be used in terms of conductivity and specific surface area.

CNTs are rolled-up sheets of graphite having diameters of 1 to 10 nm. The length of CNTs in the longitudinal direction is typically several tens to several hundreds of micrometers. Also available are CNTs as long as several millimeters, which are called super-growth CNTs.

CNTs are a carbonaceous material composed of rolled-up graphene sheets (sheets of graphene) and are divided into single-walled CNTs (SWCNTs) and multi-walled CNTs (MWCNTs) according to the number of circumferential walls.

Graphene, constituting part of the graphite structure, is an assembly of carbon atoms forming a two-dimensional arrangement of planar six-membered carbon rings, that is, a single layer of carbon.

As exemplified above, any type of material termed CNTs can be used.

Carbon nanoparticles are nano-scaled ($10^{-6}$ to $10^{-9}$ m) carbon-based particles other than CNTs, including carbon nanohorns, amorphous carbon, and fullerene. Carbon nanohorns, a type of carbon nanoparticle, are graphite sheets rolled into cones such that they have closed conical ends.

Carbon nanofilaments, also called carbon nanofibers, are rolled-up sheets of graphite having diameters of 10 to 1,000 nm. Carbon nanofibers are highly branched hollow carbon-based fibers having thicknesses of 75 nm or more. Examples of commercial products include those available from Showa Denko K.K. under the trade names VGCF and VGNF.

The content of the conductive material in the electrodes can be 1% to 90% by weight of the electrodes. If the content of the conductive material is 90% by weight or less, a freestanding flexible film can be easily formed. If the content of the conductive material is 1% by weight or more, sufficient conductivity can be achieved.

The polymer used for the electrodes can be any polymer having sufficient flexibility to deform as the actuator bends. In particular, a polymer that is poorly hydrolysable and is stable in air can be used.

In addition to the polymer and the conductive material, the electrodes may contain another component, for example, an inorganic filler such as zeolite or porous silica gel.

In particular, the content of the polymer can be 10% to 60% by weight. Whereas the content of the conductive material can be increased relative to the content of the polymer for higher conductivity, if the content of the polymer is 10% by weight or more, freestanding electrodes with superior mechanical strength can be formed. On the other hand, if the content of the polymer is 60% by weight or less, the content of the conductive material is relatively high, so that practical electrodes can be formed in view of the response speed of the actuator and the force yielded.

If the linear electrodes contain at least a nanocarbon material, as typified by CNTs, and a polymer material, the nanocarbon material, which itself has significantly high conductivity and specific surface area for ion adsorption, can be uniformly dispersed in the linear electrodes without aggregation.

As a result, the electrodes have higher conductivity and specific surface area for ion adsorption, and an actuator incorporating the electrodes produces a large displacement when driven.

Examples of such polymers include polyolefins such as polyethylene and polypropylene; polystyrene; polyimide; polyarylenes (aromatic polymers) such as poly(p-phenylene oxide), poly(2,6-dimethylphenylene oxide), and poly(p-phenylene sulfide); and polyolefins, polystyrenes, polyimides, and polyarylenes (aromatic polymers) having a sulfonate (—$SO_3H$), carboxyl (—COOH), phosphate, sulfonium, ammonium, or pyridinium group introduced thereto; fluoropolymers such as polytetrafluoroethylene and polyvinylidene fluoride; perfluorosulfonate polymers, perfluorocarboxylate polymers, and perfluorophosphate polymers having a sulfonate, carboxyl, phosphate, sulfonium, ammonium, or pyridinium group introduced to the fluoropolymer backbone thereof; polybutadienes; polyurethanes such as elastomers and gels; silicones; polyvinyl chloride; polyethylene terephthalate; nylon, and polyarylates. These polymers can be used alone or in combination, can be functionalized, and can be copolymerized with another polymer.

In particular, polyvinylidene fluoride-hexafluoropropylene copolymer (PVDF-HFP), polyvinylidene fluoride (PVDF), and poly(methyl methacrylate) (PMMA) can be used in view of the affinity for ionic liquids. In addition, the polymer used can be one highly compatible with the planar electrolyte member. This allows formation of more robust electrodes with higher compatibility with and adhesion to the planar electrolyte member. For this purpose, the polymer used can be one having a polymer structure or functional group that is of the same group as, is similar to, or is identical to that of the polymer compound used for the planar electrolyte member. In addition, relatively rigid polymer materials, such as polyamide and polyimide, form hard but flexible linear members. Such polymer materials can be used to increase the force produced by the actuator.

Constituent Materials for Flexible Conductive Members

The flexible conductive members connect the bundles of linear members together and ensure good conduction with the conductive connecting members.

The flexible conductive members filling the gaps between the linear members used in this embodiment can be formed of any material that has good conductivity and that does not degrade the performance of the actuator. For example, known conductive elastomers and conductive gels can be used. As an example of a conductive elastomer, a silicone rubber containing conductive particles can be used. The conductive particles used can be, for example, a carbonaceous material such as carbon black, carbon fibers, or graphite, or a fine powder, foil, or fibers of a metal such as silver, copper, aluminum, chromium, titanium, tungsten, cobalt, zinc, or nichrome, an alloy thereof, or a metal-coated glass. As a conductive gel, a gel containing CNTs and an ionic liquid can be used, and a material containing them together with a polymer can also be used. In addition, such materials can be used in combination. In particular, a combination of CNTs and an ionic liquid can be used in this embodiment to form a gel composition having CNTs well dispersed therein. Flexible conductive members containing the same polymer material as the linear members can also be used for closer contact with or higher adhesion to the linear members.

Furthermore, the flexible conductive members can be formed of a material similar to that of the conductive connecting members, or the same material can be used for both. That is, for example, as described above, the flexible conductive members can be formed using a gel material containing CNTs and an ionic liquid, which is one of the materials that can be used for the conductive connecting members described below. That is, the linear members and the gel material can be stacked and pressed to introduce the material between the linear members. This allows formation of an electrode including a plurality of linear members, a flexible conductive member filling the gaps between the linear members, and a conductive connecting member configured to supply a current to the flexible conductive member at the same time, thus simplifying the fabrication of the actuator.

Constituent Materials for Conductive Connecting Members

The conductive connecting members connect the electrodes in the supporting portion to the conduction paths of the third electrodes, that is, the flexible conductive members or the bundles of linear electrodes.

The conductive connecting members can be formed of a metal, a known flexible conductive material, a plied yarn of conductive fabric or ultrathin metal fibers and polyester threads, or a combination thereof.

The conductive connecting members may be of any shape, such as a wire, sheet, or coil. If a metal wire is to be used, it can be shaped into a coil so that it can more easily follow the bending. The conductive connecting members can also be the linear electrodes or bundles of linear electrodes described above.

Furthermore, a wire mesh can be used. The wire mesh can be formed of any material that has good conductivity and sufficient elasticity and that is easy to process. Examples of such materials include stainless steel wires, tin-plated copper wires, copper weld wires (tin plating, copper, and steel), Monel wires (alloy of copper and nickel), and aluminum wires. In addition, a wire mesh filled with an elastomer can be used. Also, a metal foil or a fabric formed by weaving together threads having metal foils spirally wound therearound can be used. In addition, these materials can be used in combination.

The conductive connecting members, which are disposed so as to electrically connect the electrodes in the supporting portion to the conduction paths of the third electrodes, can be stacked over the third electrodes or be woven between the linear members. The conductive connecting members can also be passed through the third electrodes. Alternatively, the flexible conductive members filling the gaps between the linear members and the conductive connecting members can be formed of the same material.

The conductive connecting members and the conduction paths of the third electrodes can also be connected together by stacking the conductive connecting members on the third electrodes and then joining them together under pressure with or without heat. In this case, flexible conductive connecting members containing the same polymer material as the third electrodes can be used for closer contact with or higher adhesion to the linear electrodes.

In addition, the flexible conductive members forming the conduction paths and the conductive connecting members can be formed of the same material. This material and the linear members can be stacked and pressed by hot pressing to form a conductive layer including a plurality of linear members, a flexible conductive member filling the gaps between the linear members, and a conductive connecting member configured to supply a current to the conduction paths at the same time, thus simplifying the fabrication of the actuator.

For the conductive connecting members, any materials that are not harmful for the function of the actuator can be used alone or in combination, including metals (planar, linear, or particulate), conductive polymers, and the same material as the linear electrodes.

In particular, if the conductive connecting members contain at least a nanocarbon material, as typified by CNTs, and a polymer material, as are the electrodes, a larger displacement can be produced upon driving because the material is highly conductive and flexible, as described above, and also imparts the ability to accumulate ions to the conductive connecting members.

For example, a CNT gel containing CNTs and an ionic liquid or a conductor-containing paste (grease) such as silver paste can be used. In addition, if the conductive connecting members are formed of a linear electrode, or a bundle of linear electrodes, containing a nanocarbon material, they are highly conductive, as are the linear electrodes, so that electric charges, namely, electrons or holes, can efficiently move from the voltage-applying terminals through the linear electrodes to generate a potential difference between the electrodes.

Constituent Materials for Planar Electrolyte Member

The planar electrolyte member is a flexible member containing an electrolyte and a polymer material.

Examples of polymer materials include fluoropolymers such as polytetrafluoroethylene and polyvinylidene fluoride; polyolefins such as polyethylene and polypropylene; polybutadienes; polyurethanes such as elastomers and gels; silicones; thermoplastic polystyrene; polyvinyl chloride; and polyethylene terephthalate. These polymers can be used alone or in combination, can be functionalized, and can be copolymerized with another polymer. The electrolyte member contains an electrolyte. This allows the actuator to operate as ions migrate upon application of a voltage.

Examples of electrolytes include lithium fluoride, lithium bromide, sodium bromide, magnesium chloride, copper sulfate, sodium acetate, and sodium oleate. Ionic liquids can also be used. If an ionic liquid is used, the polymer can be PVDF-HFP, PVDF, perfluorosulfonate polymers (Nafion), poly(2-hydroxyethyl methacrylate) (PHEMA), PMMA, polyethylene oxide (PEO), and polyacrylonitrile (PAN).

In particular, combinations of ionic liquids and polymers with high affinity are known as ionic gels. Examples of ionic gels include the combination of 1-ethyl-3-methylimidazolium (EMIM) tetrafluoroborate ($BF_4$) and PVDF-HFP and the combination of EMIM bis(trifluoromethylsulfonyl)imide (TFSI) and PMMA.

The ionic liquid used for the actuator according to this embodiment, which is also called a room-temperature molten salt or simply a molten salt, is a salt remaining molten over a wide temperature range including room temperature, for example, at 0° C., preferably −20° C., more preferably −40° C. In addition, the ionic liquid can have high ionic conductivity.

The ionic liquid used for the actuator according to this embodiment can be any known ionic liquid. In particular, the ionic liquid used can be a stable one remaining liquid at or around room temperature. Examples of ionic liquids used for the actuator according to this embodiment include imidazolium salts, pyridinium salts, ammonium salts, and phosphonium salts. As the ionic liquid, a combination of two or more ionic liquids can also be used.

More specifically, the ionic liquid is exemplified by those composed of cations represented by general formulas (1) to (4) (particularly, an imidazolium ion) and anions:

[Chem. 1]

(1)

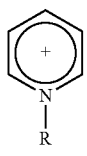

(2)

$[NR_xH_{4-x}]^+$ (3)

$[PR_xH_{4-x}]^+$ (4)

In formulas (1) to (4) above, R is an alkyl group having 1 to 12 carbon atoms or a functional group having an ether bond and a total of 3 to 12 carbon and oxygen atoms. In formula (1), R1 is an alkyl group having 1 to 4 carbon atoms or a hydrogen atom. In formula (1), R and R1 can be different. In formulas (3) and (4), x is an integer of 1 to 4.

The anion of the ionic liquid can be at least one anion selected from a tetrafluoroborate anion, hexafluorophosphate anion, bis(trifluoromethanesulfonyl)imidate anion, perchlorate anion, tris(trifluoromethanesulfonyl)carbon acid anion, trifluoromethanesulfonate anion, dicyanamide anion, trifluoroacetate anion, organic carboxylate anion, and halogen ion.

The thickness of the planar electrolyte member is preferably 10 to 500 μm, more preferably 10 to 400 μm. If the thickness exceeds 500 μm, the film has high flexural rigidity and may obstruct the bending motion of the actuator. On the other hand, if the thickness falls below 10 μm, the bending motion may be insufficient because the planar electrolyte member has a lower capacity to retain the ionic material and therefore supplies a smaller amount of ionic material to the electrodes.

Method for Producing Actuator

The actuator according to this embodiment can be produced by any method that allows production of the above actuator.

For example, the conductive connecting members, third electrodes, and planar electrolyte member described above can be separately formed, be stacked on top of each other, and be pressed by hot pressing (heat press bonding) with the planar electrolyte member held between the third electrodes. Alternatively, the linear members can be coated with the conductive connecting members and be pressed by hot pressing with the planar electrolyte member held therebetween. As used herein, the term "hot pressing" refers to both pressing while heating and heating in a pressed state.

The temperature, pressure, and time for hot pressing may be appropriately selected depending on the materials used, although the heating temperature should be below the decomposition temperatures of the materials used. For example, the temperature for hot pressing can be 30° C. to 150° C. In addition, the pressure is preferably 1 to 100 kg/cm², more preferably 10 to 50 kg/cm².

It is also possible to form a film structure including a planar polymer member held between electrodes and impregnate the film structure with water, an ionic liquid, or a mixture thereof after the formation of the actuator. In this case, the actuator may be immersed in the liquid. The concentration of the liquid for immersion and the immersion time are not particularly limited and may follow those of known methods.

The shape of the actuator according to this embodiment is not limited to a flat shape, and an actuator of any shape can be easily produced.

EXAMPLES

The present invention will now be described in more detail with reference to examples.

Measurement of Amount of Displacement of Actuator

A strip-shaped actuator having a width of 1 mm and a length of 16 mm is formed, and a portion extending 3 mm from an end of the actuator in the longitudinal direction is held by a holder equipped with platinum electrodes. The holder has terminals that can apply different potentials to both surfaces of the actuator and that can be connected to the electrodes so that they do not conduct.

The terminals are connected to conductive wires for connection to a power supply.

With this configuration, a voltage is applied between the platinum electrodes of the holder in air to bend the leading end of the actuator in the thickness direction (in air).

The amount of displacement of the actuator is measured at a position 10 mm from the fixed end at a drive voltage of ±1.0 V and a drive frequency of 0.1 Hz using a laser displacement sensor.

Example 1

Actuator Having Linear Electrodes on One Surface and Cast Film on Other Surface

Example 1 is an actuator having a three-layer structure including linear members containing a conductive material (linear electrodes), a planar electrolyte member, and a single-film electrode with a conductive connecting member disposed on the surfaces of the linear electrodes.

The planar electrolyte member was formed as follows. First, 100 mg of PVDF-HFP was mixed with tetrahydrofuran (THF)/acetonitrile (5/1) and 100 mg of 1-butyl-3-methylimidazolium tetrafluoroborate ($BMIBF_4$), serving as an ionic liquid, while being heated to 80° C. and was cast into a film. This film was then dried to form a planar electrolyte member.

The single-film electrode was formed using CNTs as follows. First, 50 mg of SWCNTs (available from Unidym, Inc. under the trade name "HiPco"; diameter: about 1 nm; length: 1 μm), serving as a conductive material, 80 mg of BMIBF$_4$, and 1 mL of dimethylformamide (DMF) were mixed and were processed in a ball mill for 30 minutes. The mixture was then mixed with 80 mg of PVDF-HFP dissolved in 2 mL of DMF and was processed in a ball mill for 30 minutes. Thus, a black paste having CNTs dispersed therein was yielded.

This black paste was cast into a film on a Teflon® sheet and was dried. The film was then cut into a strip having a width of 1 mm and a length of 16 mm to form a single-film electrode.

When the electrode was examined using a microscope, complicatedly aggregated and entangled CNTs were observed inside. In addition, it was difficult to make the aggregation and entanglement uniform in a plane, and the conductivity of the film varied at different measurement positions. Specifically, the conductivity ranged from 8 to 15 S/cm. The orientation ratio (p-value) of the CNTs in the electrode in the planar direction was substantially 1.

The linear electrodes were formed by electrospinning, described above. The above black paste was diluted about five times with DMF to prepare a dilute solution.

The prepared dilute solution was charged into a tank 16 of an electrospinning machine (available from MEC Co., Ltd.) as shown in FIG. 3. A voltage of 25 kV was applied to a spinneret to eject the conductive material dispersion toward a rotary drum collector. During this process, the drum collector was rotated at 3,000 rpm. After the conductive material dispersion was ejected while rotating the rotary drum collector for one hour, a bundle of uniaxially oriented linear electrodes wound around the rotary drum collector was yielded.

The thickness of each of the linear electrodes thus formed was about 0.9 μm. In addition, the conductivity of the linear electrodes was about 500 S/cm at any measurement point in the orientation direction. Furthermore, the degree of orientation of the linear electrodes was 88% at any measurement point in a plane. The orientation ratio (p-value) of the CNTs was about 0.2 with respect to the orientation direction at any measurement point in a plane. The resultant bundle of linear electrodes was cut into a strip having a width of 1 mm and a length of 16 mm. The linear electrodes were uniaxially aligned in the width direction.

The conductive connecting member was formed as follows. As in the case of the single-film electrode, the black paste was cast into a film on a Teflon® sheet and was dried. The film was then cut into a wire having a width of 0.4 mm and a length of 16 mm to form a wire-shaped conductive connecting member.

The conductivity of the conductive connecting member thus formed was about 10 S/cm at both ends. In addition, the orientation ratio of the CNTs in the conductive connecting member in the planar direction, namely, the p-value, was 1.

The above planar electrolyte member, single-film electrode, and strip-shaped bundle of linear electrodes were stacked on top of each other such that the planar electrolyte member is held between the single-film electrode and the strip-shaped bundle of linear electrodes. The above conductive connecting member was then stacked on the bundle of linear electrodes. The conductive connecting member was disposed perpendicularly to the uniaxial orientation direction of the linear electrodes aligned in the lateral direction of the actuator.

In addition, the conductive connecting member was disposed so as to pass through the center of the linear electrodes.

Subsequently, the stack was pressed at a pressure of 0.5 MPa with heat using a hot press heated to 40° C. for one minute, and the resultant actuator was dried in a vacuum. Thus, an actuator including linear electrodes connected together by a conductive connecting member, a single-film electrode, and a planar electrolyte member held therebetween was produced. After the hot pressing, part of the conductive wire stacked on the linear electrodes entered the gaps between the linear electrodes to serve as a flexible conductive member. The linear electrodes were pressed in advance at a pressure of 1 MPa before being stacked on the electrolyte member.

The thickness of the actuator thus produced was 135 μm. In addition, the thickness of the planar electrolyte member was 15 μm, the thickness of the single-film electrode was 50 μm, the thickness of the linear electrodes was 50 μm, and the thickness of the conductive connecting member was 10 μm.

Example 2

Actuator Having Linear Electrodes on Both Surfaces of Planar Electrolyte Member (with Linear Electrodes on Both Surfaces Oriented)

Example 2 is an actuator, as shown in FIG. 1B, having linear electrodes on both surfaces of a planar electrolyte member. The planar electrolyte member and the conductive connecting members were formed in the same manner as in Example 1. The linear electrodes used in Example 1 were prepared as two bundles and were disposed on both surfaces of the electrolyte member. The two bundles of linear electrodes were formed as strips having a width of 1 mm and a length of 15 mm and were uniaxially oriented in the width direction. These members were stacked and pressed by hot pressing in the same manner as in Example 1 to produce an actuator. As in Example 1, after the pressing, parts of the conductive wires stacked on the linear electrodes entered the gaps between the linear electrodes to serve as flexible conductive members.

The thickness of the actuator thus produced was 135 μm. In addition, the thickness of the planar electrolyte member was 15 μm, the thickness of the linear electrodes was 50 μm, and the thickness of the conductive connecting members was 10 μm.

Example 3

Actuator Having Linear Electrodes on Both Surfaces of Planar Electrolyte Member (with Linear Electrodes on Both Surfaces Oriented and Having Bundles of Linear Electrodes as Conductive Connecting Members)

In this example, which is a modification of Example 2, the members other than the conductive connecting members were formed in the same manner as in Example 2. The conductive connecting members used were bundles of linear electrodes formed of CNTs and PVDF-HFP. The conductive connecting members, serving as conductive wires, were formed by cutting the bundles of linear electrodes formed in Example 1 into wires having a width of 0.4 mm and a length of 16 mm. The bundles of linear electrodes were subjected to hot pressing before being cut for increased ease of handling. In addition, because the conductive connecting members stacked on the linear electrodes were flexible, parts of the conductive connecting members entered the gaps between the linear electrodes after the hot pressing to serve as flexible conductive members. The thickness of the actuator thus produced was 135 μl. In addition, the thickness of the planar electrolyte member was 15 μm, the thickness of the linear electrodes was 50 μm, and the thickness of the conductive connecting members was 10 μm.

Example 4

Actuator Having Electrodes (Conductive Layers) Including Insulating Linear Members, Flexible Conductive Members, and Conductive Connecting Members on Both Surfaces of Planar Electrolyte Member (with Linear Members on Both Surfaces Oriented)

Example 4 is a three-layer composite, as shown in FIG. 4, formed by stacking two third electrodes including insulating linear members (polymer fibers) and flexible conductive members with a planar electrolyte member held therebetween. Conductive connecting members were disposed on the surfaces of the third electrodes so as to cover the entire surfaces of the third electrodes. The planar electrolyte member was formed in the same manner as in Example 1.

The linear members were formed using an electrospinning machine in the same manner as in Example 1. In this example, the tank 16 was filled with a polyamic acid (U-Varnish, available from Ube Industries, Ltd.), and the resultant oriented film was amidized by heat treatment at 200° C. to form corresponding linear members. The thickness of each of the linear members was about 0.9 μm. The degree of orientation of the linear members was 85% at any measurement point in a plane.

Next, the black paste, prepared in Example 1, having CNTs dispersed therein was cast over the entire linear members and were dried to form an electrode including flexible conductive members filling the gaps between the linear members and a layer of conductive connecting member formed over the entire surface of the third electrode. The electrode was cut into a predetermined strip shape to form multilayer composites including third electrodes and conductive connecting members. The conductivity, varying at different measurement positions, was about 8 to 15 S/cm.

The above electrodes including the insulating linear members, the flexible conductive members, and the conductive connecting members were stacked with the planar electrolyte member disposed therebetween, were pressed with heat, and were dried in a vacuum to produce a corresponding actuator. The linear members were uniaxially aligned in the width direction.

The thickness of the actuator thus produced was 230 μm. In addition, the thickness of the planar electrolyte member before pressing was 180 μm, and the thickness of the third electrodes and the conductive connecting members was 90 μm.

As a comparative example for Example 4, an actuator different from Comparative Example 1 in the thicknesses of the electrodes and the planar electrolyte member was used as Comparative Example 2. The thickness of the actuator of Comparative Example 2 was 210 μm, the thickness of the planar electrolyte member before pressing was 180 μm, and the thickness of the third electrodes and the conductive connecting members was 80 μm.

The actuators of Example 4 and Comparative Example 2 had a width of 1 mm and a length of 12 mm.

Characteristics Evaluation of Actuators

As demonstrated in Examples 1 to 3, the use of CNTs as the conductive material for the linear electrodes allowed the orientation ratio (p-value) to be controlled to 0.1 to 0.2, which is significantly close to the value at which the CNTs are completely oriented (P=0). Because the CNTs were well dispersed in the linear electrode direction uniformly in a plane, the conductivity was high and uniform in the surfaces of the electrodes. Because the fibers were thin, namely, 0.9 μm thick, the conductivity and the degree of orientation of the CNTs were high. This is probably because the CNTs were uniformly dispersed as a result of reduced aggregation and entanglement of the CNTs in the fibers.

In the actuators of the above examples, which had a planar electrolyte member held between electrodes, the electrical energy applied via the electrodes caused ions in the electrolyte member to migrate, thus bending the actuators.

The above actuators were evaluated by comparing them with a known actuator having single-film electrodes shown in Example 1 on both surfaces of a planar electrolyte member, serving as Comparative Example 1, as follows.

An AC potential having a voltage of ±1.0 V and a frequency of 0.1 Hz was applied between the electrodes of the actuators of Examples 1 to 3 and Comparative Example 1 to compare the amounts of displacement thereof.

The amount of displacement of the actuator of Comparative Example 1 due to bending (half the maximum swinging width at a position 10 mm from the fixed end) was about 0.16 mm.

In contrast, the actuator of Example 1, having linear electrodes on one surface thereof, had a lower flexural rigidity and therefore produced a larger displacement than that of Comparative Example 1 in bending in the direction in which the linear electrodes expanded, that is, in the direction opposite the linear electrodes.

The amount of displacement was also increased in bending in the direction toward the linear electrodes, although it was smaller than that in the opposite direction. Thus, the total amount of displacement was about 1.8 times larger than that of Comparative Example 1.

In addition, the actuator of Example 2, having linear electrodes on both surfaces, had a lower flexural rigidity and therefore produced a larger displacement than that of Example 1 in either bending direction.

In addition, the actuator of Example 3 had a lower flexural rigidity in bending and also suffered a smaller voltage drop over the planes of the linear electrodes so that a voltage can be more uniformly applied to both surfaces of the planar electrolyte member, thus producing a larger amount of displacement than that of Example 2.

The amount of displacement of Example 2 was estimated to be four times that of Comparative Example 1, and the amount of displacement of Example 3 was estimated to be five times that of Comparative Example 1.

Characteristics Evaluation of Actuator of Example 4

A strip-shaped actuator having a width of 1 mm, a length of 12 mm, and a predetermined thickness was prepared. A portion extending 2 mm from an end of the actuator was held by a holder equipped with platinum electrodes (terminals), and a voltage was applied in air (driving in air).

As the deformation response characteristics of the actuator, the amount of displacement at a predetermined position was evaluated. The amount of displacement was measured at a position (actuator measurement point) 9 mm from the fixed end at a drive voltage of +1.0 V and a drive frequency of 1 Hz using a laser displacement sensor.

The strain ε was calculated from the amount of displacement measured using the laser displacement sensor by the following equation:

$$\epsilon = 2d\delta/(l^2 + \delta^2)$$

where d is the thickness of the actuator (mm), δ is half the maximum amount of displacement measured using a laser displacement sensor, and l is the distance from the actuator (actuator measurement point) to the laser displacement sensor, which was 8 mm in this measurement. The values are all expressed in mm.

The force produced by the bending motion of the actuator was evaluated using a load cell for evaluation of extremely small force (UL-10GR, available from Minebea Co., Ltd.).

Specifically, a portion extending 2 mm from an end of the actuator having a width of 1 mm and a length of 12 mm in the longitudinal direction was held by a holder equipped with platinum electrodes (terminals), and a voltage of +2 V was applied in air to cause bending motion. The force produced by the actuator was measured at a position 2 mm from the fixed end using the load cell.

The actuator of Example 4, which had the planar electrolyte member held between the electrodes, bent as ions in the electrolyte member migrated when electrical energy was applied through the electrodes. The actuator was evaluated by comparing it with the actuator of Comparative Example 2 as follows.

The measurement results are shown in Table 1.

TABLE 1

| | Strain (%) | | Force produced (mN) | | |
| --- | --- | --- | --- | --- | --- |
| | 0.1 Hz | 0.01 Hz | 0.5 Hz | 0.1 Hz | Capacitance (F) |
| Example 4 | 0.13 | 0.13 | 0.49 | 0.60 | $4.25 \times 10^{-2}$ |
| Comparative Example 2 | 0.10 | 0.09 | 0.30 | 0.31 | $2.07 \times 10^{-2}$ |

The strains (amounts of displacement) caused by applying an AC potential having a voltage of +1.0 V and a frequency of 0.1 Hz an AC potential having a voltage of +1.0 V and a frequency of 0.01 Hz between the electrodes of the actuators of Example 4 and Comparative Example 2 were compared. As a result, the strain of Example 4 was about 30% to 40% larger than that of Comparative Example 2. This demonstrates that an actuator having electrodes including insulating linear members, flexible conductive members, and conductive connecting members on both surfaces of a planar electrolyte member bends easily on both surfaces of the planar electrolyte member, thus producing large displacement.

That is, because the linear members were disposed so as to cross the bending direction, the actuator had low resistance to bending due to the flexural rigidity thereof. As a result, the actuator bent smoothly, thus producing a large amount of displacement in bending.

Similarly, the forces produced by applying an AC potential having a voltage of +2.0 V and a frequency of 0.1 Hz and an AC potential having a voltage of +2.0 V and a frequency of 0.5 Hz were compared. As a result, the force produced by the actuator of Example 4 was up to about twice the force produced by the actuator of Comparative Example 2. In addition, these actuators were evaluated for capacitance by cyclic voltammetry at ±0.5 V and 1 mV/sec. As a result, the capacitance of Example 4 was up to about more than twice that of Comparative Example 2.

As demonstrated in the above examples, the present invention can provide an actuator that can bend easily to produce a large amount of displacement.

The actuators as described above can be used for various applications, including small devices, such as artificial muscles, robot arms, prosthetic limbs, and micromachines, and larger devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-102520, filed Apr. 27, 2010, which is hereby incorporated by reference herein in its entirety.

The invention claimed is:

1. An actuator comprising:
a supporting portion including a first electrode, a second electrode disposed opposite the first electrode, and a part of a planar electrolyte member disposed therebetween, the supporting portion having terminals configured to apply a voltage between the first and second electrodes;
a displacement portion configured to be displaced as a voltage applied between the first and second electrodes causes ions in the electrolyte member to migrate; and
an intermediate portion disposed between the supporting portion and the displacement portion, the intermediate portion including a third electrode on the electrolyte member and a conductive connecting member configured to supply a current to the third electrode, the third electrode including a plurality of linear members and a conductive material, the linear members having major axes thereof extending in a direction crossing a direction from the supporting portion toward the displacement portion, the third electrode having a plurality of conduction paths through which a current flows in the crossing direction, the conductive connecting member being electrically connected to one of the first and second electrodes, the conductive connecting member electrically connecting the conduction paths together.

2. The actuator according to claim 1, wherein the linear members of the third electrode comprise linear electrodes containing a conductive material.

3. The actuator according to claim 2, wherein the electrolyte member has, on one surface thereof, a plurality of first linear electrodes and a first conductive connecting member configured to supply a current to the first linear electrodes such that the first conductive connecting member electrically connects the first linear electrodes together, and the electrolyte member has, on another surface thereof, a plurality of second linear electrodes and a second conductive connecting member configured to supply a current to the second linear electrodes such that the second conductive connecting member electrically connects the second linear electrodes together.

4. The actuator according to claim 2, wherein the conductive connecting member is a linear electrode containing at least a nanocarbon material and a polymer material.

5. The actuator according to claim 1, wherein the third electrode includes a flexible conductive member filling gaps between the linear members.

* * * * *